United States Patent
Zhai et al.

(10) Patent No.: US 10,178,548 B2
(45) Date of Patent: Jan. 8, 2019

(54) METHOD FOR PROTECTING TERMINAL LOCATION INFORMATION AND INTELLIGENT TERMINAL

(71) Applicant: Huawei Technologies Co., Ltd., Shenzhen (CN)

(72) Inventors: Zhengde Zhai, Beijing (CN); Yu Shen, Beijing (CN); He Wei, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 4 days.

(21) Appl. No.: 15/491,072

(22) Filed: Apr. 19, 2017

(65) Prior Publication Data
US 2017/0223527 A1   Aug. 3, 2017

Related U.S. Application Data

(63) Continuation of application No. PCT/CN2015/089812, filed on Sep. 16, 2015.

(30) Foreign Application Priority Data

Dec. 22, 2014   (CN) .......................... 2014 1 0811351

(51) Int. Cl.
*H04W 24/00* (2009.01)
*H04W 12/02* (2009.01)
(Continued)

(52) U.S. Cl.
CPC ............. *H04W 12/02* (2013.01); *H04L 67/18* (2013.01); *H04M 1/72572* (2013.01);
(Continued)

(58) Field of Classification Search
CPC ............................. H04W 4/029; H04W 64/00
See application file for complete search history.

(56) References Cited

U.S. PATENT DOCUMENTS

2002/0173317 A1* 11/2002 Nykanen ................. H04W 4/02
455/456.1
2012/0282945 A1   11/2012 Guha et al.
(Continued)

FOREIGN PATENT DOCUMENTS

CN   102445697 A   5/2012
CN   103136472 A   6/2013
(Continued)

OTHER PUBLICATIONS

Machine Translation and Abstract of Chinese Publication No. CN103561384, Feb. 5, 2014, 17 pages.
(Continued)

*Primary Examiner* — Shantell L Heiber
(74) *Attorney, Agent, or Firm* — Conley Rose, P.C.

(57) ABSTRACT

A method for protecting intelligent terminal location information is provided, where the method includes: responding to a location query request from an APP, and acquiring current location coordinates of the intelligent terminal; acquiring a privacy sensitivity level of an area in which the current location coordinates are located; acquiring a location trust level of the APP; and obtaining, according to the location trust level of the APP and the privacy sensitivity level of the area in which the current location coordinates are located, a response manner corresponding to the location query request from the APP. In addition, some embodiments of the present application further disclose an intelligent terminal.

11 Claims, 4 Drawing Sheets

(51) Int. Cl.
*H04W 4/02* (2018.01)
*H04L 29/08* (2006.01)
*H04M 1/725* (2006.01)
*H04W 48/04* (2009.01)
*H04W 4/021* (2018.01)
*H04W 4/14* (2009.01)

(52) U.S. Cl.
CPC ............. *H04W 4/02* (2013.01); *H04W 48/04* (2013.01); *H04M 1/72577* (2013.01); *H04W 4/021* (2013.01); *H04W 4/14* (2013.01)

(56) References Cited

U.S. PATENT DOCUMENTS

| | | |
|---|---|---|
| 2012/0309350 A1 | 12/2012 | Kim |
| 2013/0291086 A1 | 10/2013 | Pontillo et al. |
| 2013/0303126 A1 | 11/2013 | Frank et al. |
| 2014/0013429 A1 | 1/2014 | Lu et al. |
| 2014/0059695 A1 | 2/2014 | Parecki et al. |
| 2015/0121482 A1* | 4/2015 | Berman .................. H04L 63/10 726/5 |

FOREIGN PATENT DOCUMENTS

| | | |
|---|---|---|
| CN | 103561384 A | 2/2014 |
| CN | 103581417 A | 2/2014 |
| CN | 103686600 A | 3/2014 |
| WO | 2012024156 A2 | 2/2012 |

OTHER PUBLICATIONS

Foreign Communication From a Counterpart Application, Chinese Application No. 201410811351.0, Chinese Office Action dated Sep. 5, 2018, 4 pages.
Foreign Communication From a Counterpart Application, Chinese Application No. 201410811351.0, Chinese Search Report dated Jul. 30, 2018, 2 pages.
Machine Translation and Abstract of Chinese Publication No. CN102445697, May 9, 2012, 7 pages.
Machine Translation and Abstract of Chinese Publication No. CN103581417, Feb. 12, 2014, 7 pages.
Machine Translation and Abstract of Chinese Publication No. CN103686600, Mar. 26, 2014, 13 pages.
Foreign Communication From a Counterpart Application, PCT Application No. PCT/CN2015/089812, English Translation of International Search Report dated Dec. 7, 2015, 2 pages.
Foreign Communication From a Counterpart Application, PCT Application No. PCT/CN2015/089812, English Translation of Written Opinion dated Dec. 7, 2015, 7 pages.
Foreign Communication From a Counterpart Application, European Application No. 15871734.8, Extended European Search Report dated Sep. 19, 2017, 37 pages.

* cited by examiner

METHOD FOR PROTECTING TERMINAL LOCATION INFORMATION AND INTELLIGENT TERMINAL

CROSS-REFERENCE TO RELATED APPLICATIONS

This application is a continuation of International Application No. PCT/CN2015/089812, filed on Sep. 16, 2015, which claims priority to Chinese Patent Application No. 201410811351.0, filed on Dec. 22, 2014, both of which are hereby incorporated by reference in their entireties.

TECHNICAL FIELD

The present application relates to the intelligent terminal security field, and in particular, to a method for protecting terminal location information and an intelligent terminal.

BACKGROUND

Geographical location information is one piece of data most favorably collected by various applications (APPs) on an intelligent terminal, and is also key data on which many APPs depend when performing their core services. Location information is generally indicated using location coordinates. As important geographical data with a context, the location coordinates disclose user privacy, and even a business secret. For example, a user appears in a mental hospital for multiple times, which may imply that the user may suffer from some sort of mental disorder; a chief executive officer (CEO) of a large company repeatedly appears in a location of another company, which may imply that the company is planning acquisition or an important commercial transaction. Therefore, to avoid that an APP excessively collects location information of a user, it is imperative to protect user privacy. The location information is core data on which service logic of many APPs depends. If location data cannot be obtained, many functions cannot be properly performed (such as a map, a location-based query, and location-based social contact).

The intelligent terminal can use multiple types of devices and facilities to acquire the location information, such as a global positioning system (GPS), and a radio base station. It takes a long time to perform positioning by the GPS, and power consumption in a process is relatively large; however, positioning accuracy is relatively high. A positioning speed of the radio base station is high, and power consumption in a process is small; however, accuracy is lower than the accuracy of the GPS. On the intelligent terminal, various APPs use a unified location application programming interface (API) to read current location data of the intelligent terminal. The location data is returned to the APPs in a form of longitude and latitude coordinates, such as (124.123, 87.231). Because a location is an important data resource, an operating system of the intelligent terminal uses a right to protect the resource. When an APP invokes an API to read a terminal location, the operating system first checks whether the APP obtains a corresponding right; if there is no such a right, the APP is rejected accessing the location.

According to some existing APP right management solutions, such as a mobile phone manager, and a security manager, a user is allowed to deprive an installed APP of a right of reading a geographical location, so that the APP cannot read a location of the user. Once a location right is deprived, the APP cannot read a real location of the user, which affects a normal service function of the APP, such as a map location query, and location-based social contact. Although the user can reassign the location right to the APP, the user needs to decide time of depriving the location right of that type of APP, and time of reassigning the location right to that type of APP.

This process is repetitive and cumbersome, and the user needs to have special knowledge to determine whether each type of APP can read the location data at this time, which affects normal running of the APP. In addition, a manual operation is slow and difficult to ensure that the APP does not read a location that the user does not want the APP to read, which causes poor protection for location information.

SUMMARY

Embodiments of the present application provide a method for protecting terminal location information and an intelligent terminal, which can ensure normal running of an APP more effectively and protect location information of the intelligent terminal more powerfully.

One aspect of the present application provides a method for protecting intelligent terminal location information, where the method includes responding to a location query request from an APP, and acquiring current location coordinates of the intelligent terminal, where the APP is installed in an operating system running on the intelligent terminal; acquiring a privacy sensitivity level of an area in which the current location coordinates are located, where the privacy sensitivity level of the area in which the current location coordinates are located corresponds to a difficulty level of obtaining the current location coordinates by the APP, and a higher privacy sensitivity level of the area in which the current location coordinates are located indicates a higher difficulty level of obtaining the current location coordinates by the APP; acquiring a location trust level of the APP, where the location trust level of the APP corresponds to the difficulty level of obtaining the current location coordinates by the APP, and a higher location trust level of the APP indicates a lower difficulty level of obtaining the current location coordinates by the APP; and determining, according to the location trust level of the APP and the privacy sensitivity level of the area in which the current location coordinates are located, a response manner corresponding to the location query request from the APP.

With reference to the one aspect of the present application, in an embodiment, the acquiring a location trust level of the APP in the foregoing method includes obtaining the location trust level of the APP according to a source of the APP and a user identity inference capability of the APP, where the user identity inference capability of the APP indicates a capability of the APP for identifying a user identity of the intelligent terminal.

With reference to the one aspect of the present application and the foregoing embodiment, in another embodiment, the obtaining the location trust level of the APP according to a source of the APP and a user identity inference capability of the APP in the foregoing method includes calculating the location trust level of the APP according to a formula $T=p*m+q*(1-n)$, where T indicates the location trust level of the APP; m is a real number, belongs to [0,1], and indicates a trust degree assigned to the source of the APP; n is a real number, belongs to [0,1], and indicates the user identity inference capability of the APP; and p is a real number and belongs to [0,1], q is a real number and belongs to [0,1], and p+q=1, where p and q respectively indicate a coefficient used for the trust degree assigned to the source of the APP in calculating the location trust level of the APP and a coefficient used for the user identity inference capability of the APP in calculating the location trust level of the APP.

With reference to the one aspect of the present application and either of the foregoing embodiments, the determining, according to the location trust level of the APP and the privacy sensitivity level of the area in which the current location coordinates are located, a response manner corresponding to the location query request from the APP includes calculating, according to a formula s=(1−T)*L, a comprehensive sensitivity value s of the current location coordinates that are of the intelligent terminal and that are requested to query by the APP, where * indicates multiplication, T indicates the location trust level of the APP, and L indicates the privacy sensitivity level of the area in which the current location coordinates are located; and comparing the comprehensive sensitivity value s of the current location coordinates with a preset threshold; and if s<M, returning the real current location coordinates; if s>=M, imposing a limitation on the response manner for the location query request from the APP.

With reference to the one aspect of the present application and any of the foregoing embodiments, the imposing a limitation on the response manner for the location query request from the APP includes rejecting the location query request from the APP.

With reference to the one aspect of the present application and any of the foregoing embodiments, the imposing a limitation on the response manner for the location query request from the APP includes reminding a user of the intelligent terminal that the APP is attempting to access a current location.

With reference to the one aspect of the present application and any of the foregoing embodiments, the imposing a limitation on the response manner for the location query request from the APP includes performing logging for a current access behavior of the APP.

With reference to the one aspect of the present application and any of the foregoing embodiments, the imposing a limitation on the response manner for the location query request from the APP includes returning false location coordinates to the APP, where the false location coordinates are any one of randomly generated location coordinates, coordinates of a location near the current location, and coordinates indicating a relatively large area in which the current location is located.

Another aspect of the present application provides an intelligent terminal, where the intelligent terminal includes a location acquiring module configured to respond to a location query request from an APP, and acquire current location coordinates of the intelligent terminal, where the APP is installed in an operating system running on the intelligent terminal; a privacy level acquiring module configured to acquire a privacy sensitivity level of an area in which the current location coordinates acquired by the location acquiring module are located, where the privacy sensitivity level of the area in which the current location coordinates are located corresponds to a difficulty level of obtaining the current location coordinates by the APP, and a higher privacy sensitivity level of the area in which the current location coordinates are located indicates a higher difficulty level of obtaining the current location coordinates by the APP; a trust level acquiring module configured to acquire a location trust level of the APP, where the location trust level of the APP corresponds to the difficulty level of obtaining the current location coordinates by the APP, and a higher location trust level of the APP indicates a lower difficulty level of obtaining the current location coordinates by the APP; and a location processing module configured to determine, according to the location trust level, acquired by the trust level acquiring module, of the APP and the privacy sensitivity level, acquired by the privacy level acquiring module, of the area in which the current location coordinates are located, a response manner corresponding to the location query request from the APP.

With reference to the another aspect of the present application, in an embodiment, the trust level acquiring module is configured to calculate the location trust level of the APP according to a formula T=p*m+q*(1−n), where T indicates the location trust level of the APP; m is a real number, belongs to [0,1], and indicates a trust degree assigned to a source of the APP; n is a real number, belongs to [0,1], and indicates a user identity inference capability of the APP; and p is a real number and belongs to [0,1], q is a real number and belongs to [0,1], and p+q=1, where p and q respectively indicate a coefficient used for the trust degree assigned to the source of the APP in calculating the location trust level of the APP and a coefficient used for the user identity inference capability of the APP in calculating the location trust level of the APP.

With reference to the another aspect of the present application and the foregoing embodiment, in an embodiment, the location processing module includes a comprehensive sensitivity calculating unit configured to calculate, according to a formula s=(1−T)*L, a comprehensive sensitivity value s of the current location coordinates of the intelligent terminal, where * indicates multiplication, T indicates the location trust level of the APP, and L indicates the privacy sensitivity level of the area in which the current location coordinates are located; and a response manner determining unit configured to compare the comprehensive sensitivity value s, calculated by the comprehensive sensitivity calculating unit, of the current location coordinates with a preset threshold; and if s<M, returning the real current location coordinates; if s>=M, imposing a limitation on the response manner for the location query request from the APP.

With reference to the another aspect of the present application and the foregoing embodiment, in an embodiment, the response manner determining unit is configured to return false location coordinates to the APP, where the false location coordinates are any one of randomly generated location coordinates, coordinates of a location near the current location, and coordinates indicating a relatively large area in which the current location is located.

With reference to the another aspect of the present application and the foregoing embodiment, in an embodiment, the response manner determining unit is configured to perform logging for a current access behavior of the APP.

With reference to the another aspect of the present application and the foregoing embodiment, in an embodiment, the response manner determining unit is configured to reject the location query request from the APP.

With reference to the another aspect of the present application and the foregoing embodiment, in an embodiment, the response manner determining unit is configured to remind a user of the intelligent terminal that the APP is attempting to access a current location.

According to some embodiments of the present application, location trust classification is performed on an APP, a scope of activities of a user is divided into areas having different privacy sensitivity levels, it is automatically determined, according to a location trust level of the APP and a privacy sensitivity level of an area in which current location coordinates are located, whether privacy disclosure occurs when the APP accesses a current location, a specific response manner corresponding to a location query request from the APP is determined, and in a necessary case, accessing a real location of the user by the APP is limited. This can protect location information of a terminal more powerfully, and ensure a normal service function of the APP more effectively without a need of manually depriving and enabling a location right of the APP by the user.

BRIEF DESCRIPTION OF DRAWINGS

To describe the technical solutions in the embodiments of the present application more clearly, the following briefly describes the accompanying drawings required for describing the embodiments or the prior art. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in some embodiments of the present application with reference to the accompanying drawings in some embodiments of the present application. The described embodiments are merely some but not all of some embodiments of the present application. All other embodiments obtained by a person of ordinary skill in the art based on some embodiments of the present application without creative efforts shall fall within the protection scope of the present application.

According to some embodiments of the present application, location trust classification is performed on an APP according to a user identity inference capability of the APP and a source of the APP, a scope of activities of a user is divided into areas having different privacy sensitivity levels, and it is automatically determined whether privacy disclosure occurs when the APP accesses a current location, helping the user protect privacy. In addition, accessing a real location of the user by the APP is limited only in a necessary case, ensuring a normal service function of the APP as far as possible.

Figure 1:
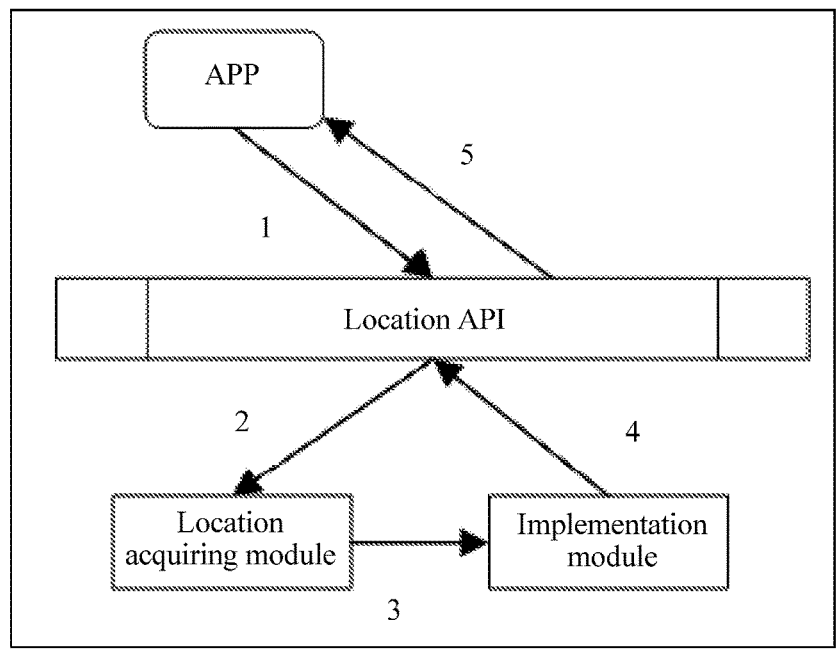
FIG. 1 is a schematic diagram of an application scenario of a method for protecting terminal location information according to an embodiment of the present application.

To make a person of ordinary skill in the art more vividly understand the technical solutions in some embodiments of the present application, the following describes some embodiments of the present application with reference to a schematic diagram of an application scenario of a solution in an embodiment of the present application in FIG. 1.

This solution may be implemented as one or more modules of an intelligent terminal, and optionally, may be implemented as one functional module that is executed in an operating system location API. A main protection object is location data generated by the intelligent terminal, a main control object is an APP in the intelligent terminal, and a trigger time is a time when the APP accesses a current location of a terminal by invoking the system location API.

The APP in an intelligent terminal system acquires the current location of the intelligent terminal by invoking the location API, and a location acquiring module acquires current location coordinates when the API is executed, where the location acquiring module herein is a part of the intelligent terminal system, and may acquire location coordinates using a GPS device or by contacting a radio base station. For example, the location acquiring module may be a GPS component or a terminal antenna.

Herein, all technical solutions of this solution are encapsulated in a location processing module. An execution procedure of an entire system is as follows.

1. The APP invokes the location API to acquire a location of the intelligent terminal.

2. Execution of the location API begins, and the location acquiring module is invoked to acquire the current location coordinates.

3. The location processing module acquires the coordinates returned by the location acquiring module, and processes coordinate data according to a location trust level of a current APP, a privacy sensitivity level of an area in which a current location is located.

4. The location processing module returns the processed coordinates to the API.

5. The API returns the processed location coordinates to the APP, and execution of the API ends.

The location processing module is a key of the entire system, and the module provides a process of processing the coordinates returned by the location acquiring module.

The intelligent terminal location information protection solution provided in this embodiment of the present application is triggered when an APP program invokes the location API to access current location coordinates. After execution of the location API, after the location API determines, using a GPS or a radio base station, the current location coordinates, and before the location API returns the current location coordinates to the APP, the location processing module performs corresponding processing on the current location coordinates.

Figure 2:
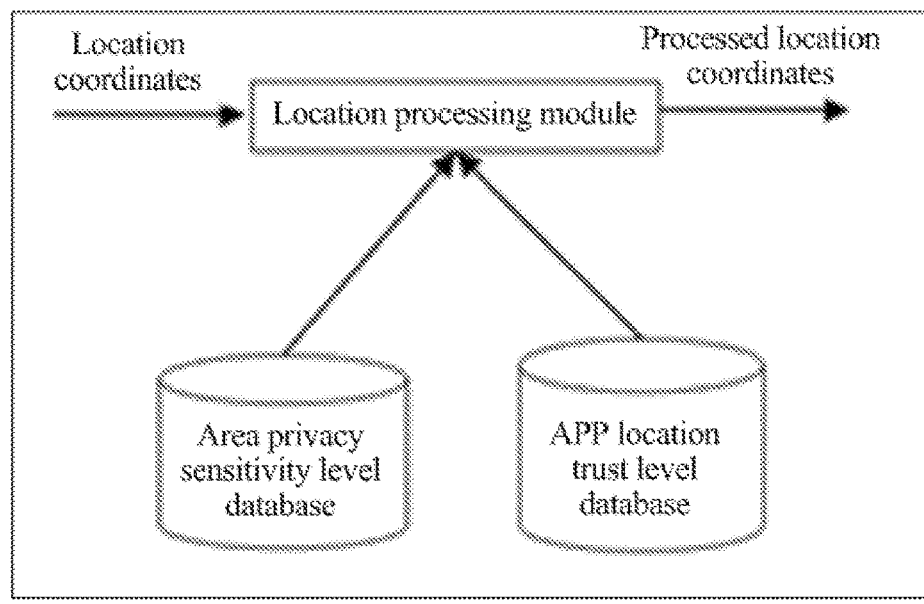
FIG. 2 is a schematic diagram of another application scenario of a solution according to an embodiment of the present application.

FIG. 2 is a schematic diagram of another application scenario of a solution according to an embodiment of the present application. As shown in FIG. 2, after acquiring coordinates returned by a location acquiring module, a location processing module processes coordinate data according to a location trust level of a current APP, and a privacy sensitivity level of an area in which a current location is located. After the processing is complete, the location processing module returns remaining logic to the location API, that is, returns the processed coordinate data to the location API.

As shown in FIG. 2, in an embodiment, the location trust level of the current APP may be obtained from an APP location trust level database. The APP location trust level database records a package path of each APP (that is, a source of the APP), and a corresponding location trust level.

As shown in FIG. 2, in an embodiment, the privacy sensitivity level of the area in which the current location is located may be obtained from an area privacy sensitivity level database. The area privacy sensitivity level database records a location scope of each area and a privacy sensitivity level corresponding to the area.

Figure 3:
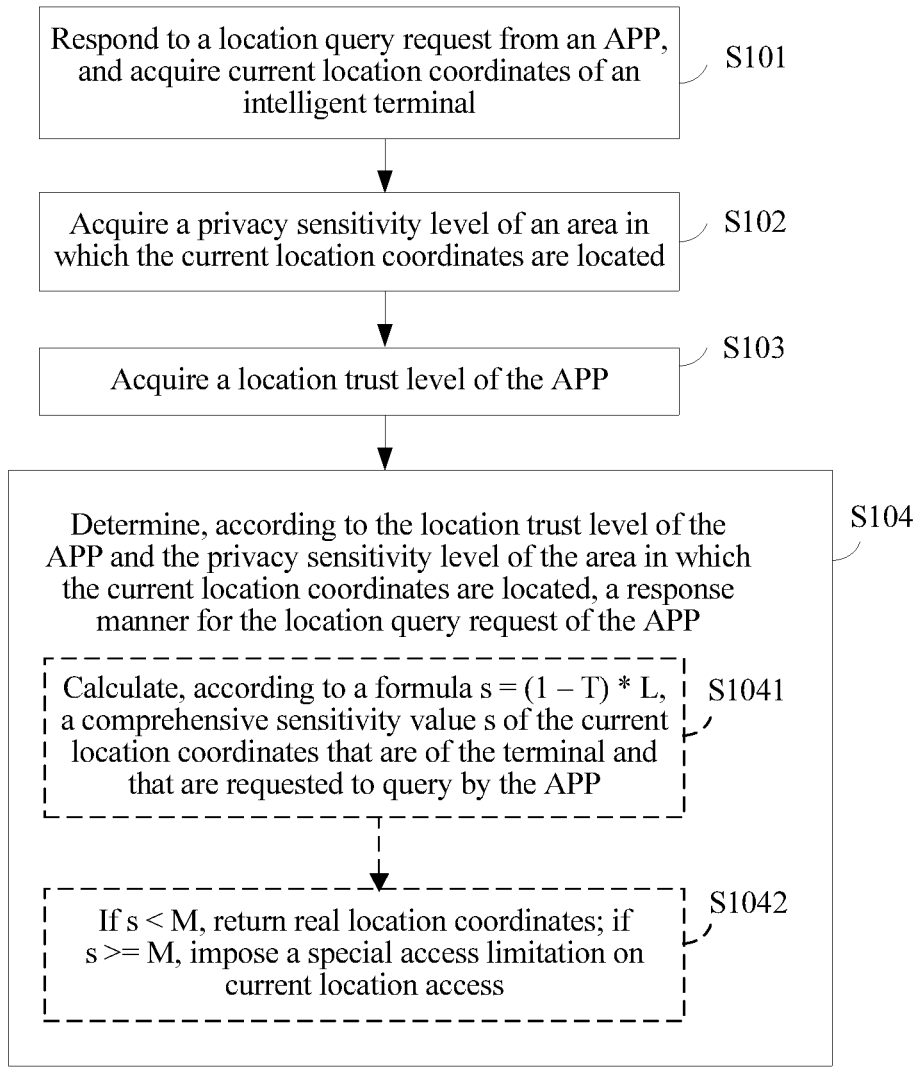
FIG. 3 is a flowchart of a method for protecting terminal location information according to an embodiment of the present application.

The following describes an entire procedure of the technical solution of the present application in detail. As shown in FIG. 3, an embodiment of the present application provides a method for protecting terminal location information, where the method includes the following steps.

S101. Respond to a location query request from an APP, and acquire current location coordinates of an intelligent terminal, where the APP is installed in an operating system running on the intelligent terminal.

The APP may acquire a location of the intelligent terminal by invoking a location API. An APP program invokes the location API to trigger an action of acquiring the current location coordinates of the intelligent terminal.

When wanting to query the current location coordinates of the intelligent terminal, an APP sends a current location query request by means of invoking a location API. After receiving the location query request, the location API triggers an action of acquiring the current location coordinates of the intelligent terminal.

Optionally, the intelligent terminal may determine the current location coordinates using a GPS or a radio base station.

S102. Acquire a privacy sensitivity level of an area in which the current location coordinates are located, where the privacy sensitivity level of the area in which the current location coordinates are located corresponds to a difficulty level of obtaining the current location coordinates by the APP, and a higher privacy sensitivity level of the area in which the current location coordinates are located indicates a higher difficulty level of obtaining the current location coordinates by the APP.

In an embodiment, the privacy sensitivity level of the area in which the current location coordinates are located is located may be obtained from an area privacy sensitivity level database. The area privacy sensitivity level database records a location scope of each area and a privacy sensitivity level corresponding to the area.

In an embodiment, the privacy sensitivity level of an area in which a current location is located may be specified by a user.

S103. Acquire a location trust level of the APP, where the location trust level of the APP corresponds to the difficulty level of obtaining the current location coordinates by the APP, and a higher location trust level of the APP indicates a lower difficulty level of obtaining the current location coordinates by the APP.

In an embodiment, the location trust level of the APP may be obtained from an APP location trust level database. The APP location trust level database records a package path of each APP (that is, a source of the APP), and a corresponding location trust level.

In an embodiment, the location trust level of the APP may be obtained by means of calculation according to a capability of the APP for inferring a user identity (which is generally referred to as a user identity inference capability of the APP) and a source of the APP.

S104. Determine, according to the location trust level of the APP and the privacy sensitivity level of the area in which the current location coordinates are located, a response manner corresponding to the location query request of the APP.

Optionally, if the location trust level of the APP and the privacy sensitivity level of the area in which the current location coordinates are located do not meet a preset requirement, for example, the location trust level of the APP is very low, and the privacy sensitivity level of the area in which the current location coordinates are located is very high, a limitation may be imposed on a processing manner of the location query request of the APP. A specific limitation manner may include one or a combination of the following several manners.

1. Reject the query request.
2. Remind a user that the APP is attempting to access a location of the user.
3. Perform logging for a current access behavior of the APP.
4. Return a false location (such as a random value, a location near a real location, or a fuzzy value indicating a relatively large area).

For example, if the location trust level of the APP and the privacy sensitivity level of the area in which the current location coordinates are located meet the preset requirement, for example, the location trust level of the APP is very high, and the privacy sensitivity level of the area in which the current location coordinates are located is very low, the real current location coordinates may be returned for the location query request of the APP.

According to this embodiment of the present application, first, an APP is classified according to a capability of the APP for inferring a user identity and a source of the APP, and each APP is assigned a different location trust level; then a scope of daily activities of a user is divided into location areas having different privacy sensitivity levels according to a rule or data specified by the user. When the user carrying an intelligent terminal enters an area having a privacy sensitivity level, privacy sensitivity of current location coordinates is determined according to the privacy sensitivity level of the area, and then processing is performed on access (a query request) of each APP to a current location based on the location trust level of the APP and privacy sensitivity of the current location.

According to this embodiment of the present application, location trust classification is performed on an APP, a scope of activities of a user is divided into areas having different privacy sensitivity levels, it is automatically determined, according to a location trust level of the APP and a privacy sensitivity level of an area in which current location coordinates are located, whether privacy disclosure occurs when the APP accesses a current location, a specific response manner to a location query request from the APP is determined, and in a necessary case, accessing a real location of the user by the APP is limited. This can protect location information of a terminal more powerfully, and ensure a normal service function of the APP more effectively without a need of manually depriving and enabling a location right of the APP by the user.

This embodiment of the present application proposes a geographical location protection solution that is based on geographical area privacy sensitivity and an APP identity identifying capability, which considers a location privacy protection requirement of a user and location-based service function availability of an APP, so that the APP can read a location of the user only when user privacy is not threatened, and that a service function of the APP is protected from interference as far as possible. For a sensitive location area, this solution ensures that only APPs having high location credibility can access real location coordinates of the user; for an insensitive location area, this solution enables as many APPs as possible to access a real location of the user to ensure normal service functions of the APPs; and allows automatically determining privacy sensitivity of a location according to a different geographical area activity regularity of each user, and imposing a corresponding privacy protection policy.

For "Acquire a privacy sensitivity level of an area in which the current location coordinates are located" mentioned in step S102, there may be multiple manners of obtaining privacy sensitivity levels of different areas, which are detailed as follows.

Generally, because of relative stability of a home and a working place, areas of daily activities of most users generally have a rough scope. In a scope of daily activities of a user, some areas are more sensitive compared with other areas, for example, when at home, the user does not want a home location to be disclosed because a personal location is collected. However, when the user appears on a commuting road, a location is not much sensitive to an extent. It can be learned that the user may hope to execute different location protection policies in different areas within a scope of activities of the user, so as to protect personal privacy.

In addition, an activity area of the user features specific repeatability, for example, most users travel to and from work according to a fixed route. For example, a CEO planning a company acquisition may need to repeatedly go to another company several times to discuss acquisition terms. After the scope of the daily activities of the user is divided into areas with different sensitivity levels for the first time, afterwards, when the user carrying an intelligent terminal enters the areas, a system may automatically determine privacy sensitivity of a current location, and control visibility of the current location to different APPs with different location trust levels according to a related location protection policy.

It should be noted that an area herein is a set of continuous geographical locations with a same privacy sensitivity level, for example, a route along which the user travels to and from work may be an area, because the area is geographically continuous, and each location in the area has same privacy sensitivity. For another example, a 500-meter scope around a building may also be an area.

There may be multiple manners of determining a privacy sensitivity level of an area as follows. Comprehensive determining may be performed in one or a combination of the multiple manners, including as described in the following examples.

(1) In an implementation manner, different areas and their corresponding privacy sensitivity levels may be specified by a user using a map APP. Using a map APP, the user uses a finger to directly sketch some privacy-sensitive areas on a touchscreen, and then specifies corresponding privacy sensitivity levels.

For example, after specifying the corresponding privacy sensitivity levels is complete, subsequently, the user only needs to perform matching on an area in which current location coordinates are located and the areas specified by the user, so as to obtain a privacy sensitivity level of the area in which the current location coordinates are located.

(2) In an implementation manner, an intelligent terminal allows a user to preset a privacy sensitivity level of a route that currently needs to be passed, records a geographical location that the user actually passes, and marks the location using the preset privacy sensitivity level. Afterwards, when the user repeatedly enters a same area, a privacy sensitivity level of a current location may be automatically determined according to a previous mark.

For example, when an area in which current location coordinates are located belongs to the foregoing area, a privacy sensitivity level of a current location may be automatically determined according to the previous mark.

(3) In an implementation manner, a user may further set that an intelligent terminal automatically acquires/determines a privacy sensitivity level of a new area. When arriving at or passing by a new location or area, the intelligent terminal queries a privacy sensitivity level of the new location or area from a server or another surrounding user, and then directly uses a recommended value of the server or an average value set by the another user.

For example, when an area in which current location coordinates are located is a new area for which no privacy sensitivity level is set previously, a privacy sensitivity level of the area may be obtained using the foregoing method (3).

Optionally, after a privacy sensitivity level corresponding to each area is pre-obtained using one or more of the foregoing three methods, an area privacy sensitivity level database may be established, where the database records a location scope of each area and a privacy sensitivity level corresponding to the area. Subsequently, when a privacy sensitivity level of an area in which a current location is located is determined, the privacy sensitivity level of the area in which the current location is located may be directly searched for in the database.

Optionally, if the privacy sensitivity level of the area in which the current location is located is not found in the database, the privacy sensitivity level of the area in which the current location is located may still be obtained using one or more of the foregoing three methods, and a result is updated into the database.

For "Acquire a location trust level of the APP" mentioned in step S103, there may be multiple manners of acquiring the location trust level of the APP, which are detailed as follows.

There may be three manners of acquiring the location trust level of the APP, where the three manners may be used separately or in combination. The three manners are as follows.

(1) Querying a Preset List

A terminal device may be preset with a trust level list of the APP, from which the location trust level of the APP can be directly queried and determined. The list may be upgraded or updated.

(2) Acquiring from an External Server

A trust level list (the list may be upgraded or updated) of the APP may be directly acquired from the external server in advance or in real time; or when a new APP is installed, a location trust level of the APP is queried from the server, and the server generally stores a trust level list of the APP.

(3) Determining by Means of Local Calculation

The location trust level T of the APP may be calculated according to a source of the APP and/or a user identity inference capability of the APP. The user identity inference capability of the APP indicates a capability of the APP for identifying a user identity of the intelligent terminal.

It is assumed that m belongs to [0,1] and indicates a trust degree assigned to the source of the APP, where 0 is a lowest trust degree, and 1 is a highest trust degree; n belongs to [0,1] and indicates the user identity inference capability of the APP, where 0 indicates that the APP has no user identity inference capability, and 1 indicates that the APP completely and clearly knows the user identity. Therefore, the location trust level $T=p*m+q*(1-n)$ of the APP may be calculated, where both p and q belong to [0,1], and $p+q=1$, where p and q respectively indicate a coefficient used for the trust degree assigned to the source of the APP in determining the location trust level of the APP and a coefficient used for the user identity inference capability of the APP in determining the location trust level of the APP.

The trust degree m assigned to the source of the APP reflects a developer of the APP and information about an application market from which the APP comes. The APP developer may be determined according to a signature on the APP, and the application market from which the APP comes may be recorded when the APP is downloaded. Trust degrees of a user for different APP developers or APP application markets may be set by the user personally, or may be recommended by a cloud in a unified manner.

The APP location trust level database records a package path of each APP (that is, a source of the APP), and a corresponding location trust level.

Optionally, after the location trust level of the APP is obtained using the foregoing method (3), a trust level of the APP may be updated into the trust level list of the APP.

Optionally, an APP location trust level database may be established based on the trust level list of the APP, where the APP location trust level database records a package path of each APP (that is, a source of the APP), and a corresponding location trust level. Subsequently, when a location trust level of an APP currently requesting to query an address is determined, the location trust level of the APP may be directly searched for in the database.

Optionally, if the location trust level of the APP currently requesting to query the address is not found in the database, the location trust level of the APP currently requesting to query the address may still be calculated using the foregoing method (3), and a result is updated into the database.

For the user identity inference capability n of the APP, there may be multiple calculation methods as follows. Comprehensive determining may be performed using one or a combination of the multiple methods.

a. At present, each APP application market provides classification of APPs, and the user identity inference capability of the APP may be determined based on the classification of APPs. For example:

APPs of a shopping category and a payment category (such as mobile phone Taobao, Alipay, and mobile phone online banking) have a strongest user identity inference capability because they are associated with account identity information of a user.

APPs of a social category (such as mobile phone QQ and WeChat) have a relatively strong user identity inference capability because they have much social information.

General document reading and map APPs have a relatively weak user identity inference capability.

b. The user identity inference capability n of the APP is calculated according to a right owned by the APP.

A degree that each right in a system affects inference of a user identity is different, for example, reading an short message service (SMS) message, reading a contact list, reading a web page browsing record are more easily to be used to infer the user identity. Different weighted values may be set for these rights, and an identity determining capability n of the APP is obtained by calculating the right owned by the APP in a weighted manner.

c. A value set or recommended by another user for the user identity inference capability n of the APP is acquired from a server or another surrounding user, and a most common value or an average value of the another user is set as a value n for the APP on a terminal of the user.

d. A value of the user identity inference capability n of the APP is affected by an amount of specific type information on a user terminal.

For example, more personal information such as SMS messages and contacts stored in the intelligent terminal indicates that in a same right situation, it is easier for the APP to infer the user identity; therefore, the value n needs to be increased. For another example, if a quantity of SMS messages is greater than a threshold, a weighted value of a right of "reading an SMS message" in the foregoing method b may be increased.

e. Data may be shared between APPs of a same developer using a system bottom layer. If the APP has an associated APP (from a same developer) in the intelligent terminal of the user, the value n of the APP is increased.

f. A value of the user identity inference capability n of the APP is determined with reference to a running status of the APP.

For example, when the APP runs at the front end, and the user can see a behavior of the APP, because it is easy for the user to discover a rule-violating behavior of the APP, in this case, the value n of the APP may be reduced.

However, when the APP runs on the background, it is difficult for the user to sense a location request behavior of the APP, and in this case, the value n of the APP may be increased.

g. The user identity inference capability of the APP may also be determined by a cloud end by analyzing code of the APP and determining whether the APP collects user identity information.

For "Determine, according to the location trust level of the APP and the privacy sensitivity level of the area in which the current location coordinates are located, a response manner to the location query request of the APP" mentioned in step S104, details are as follows.

In an implementation, a real number in [0,1] is used to indicate the location trust level T of the APP, where 0 corresponds to a lowest location trust level, and 1 corresponds to a highest location trust level. A specific calculation manner of T is described in the foregoing embodiment in detail, and is not described herein again.

A real number in [0,1] is used to indicate the privacy sensitivity level L of the area. Specially, for ease of choosing by the user, a privacy level of the area may be classified into three levels: open, moderately sensitive, and sensitive, which respectively correspond to numerical values 0, 0.6, and 1.0. Certainly, in another implementation, the numerical values may be appropriately adjusted, for example, may be adjusted to 0, 0.5, and 0.8. The present application imposes no specific limitation thereto.

Optionally, as shown in dashed line boxes in FIG. 3, step S104 includes the following steps.

S1041. Calculate, according to a formula $s=(1-T)*L$ (* indicates multiplication), a comprehensive sensitivity value s of the current location coordinates that are of the intelligent terminal and that are requested to query by the APP.

S1042. If s<M (s is less than M), return real location coordinates without any change; if s>=M (s is greater than or equal to M, and M is a preset threshold), impose a special access limitation on current location access.

In an embodiment, the access limitation includes reminding a user that the APP is accessing a location of the user, performing logging for a current access behavior, returning a false location (such as a random value, a location near a real location, or a fuzzy value indicating a relatively large area), or the like.

In conclusion, according to this embodiment of the present application, first, an APP is classified according to a capability of the APP for inferring a user identity and a source of the APP, and the APP is assigned a different location trust level; then a scope of daily activities of a user is divided into location areas having different privacy sensitivity levels according to a rule or data specified by the user; when the user carrying an intelligent terminal enters an area having a privacy sensitivity level, privacy sensitivity of current location coordinates is determined according to the privacy sensitivity level of the area, and then access of the APP to a current location is limited based on the location trust level of the APP and current location privacy sensitivity. An area herein is a set of continuous geographical locations with a same privacy sensitivity level, for example, a route along which the user travels to and from work may be an area, because the area is geographically continuous, and each location in the area has same privacy sensitivity. For another example, a 500-meter scope around a building may also be an area.

The capability of the APP for inferring the user identity and the source of the APP play a decisive role in deciding whether it is possible to threaten user privacy when the APP reads location data of the user. The source of the APP refers to an APP developer, an application market or a website from which the user downloads the APP, and the like. These factors have an important effect on whether the APP may maliciously infer the user identity and steal the user privacy. If an APP can infer the user identity (such as Zhang San), when a user appears in a relatively sensitive location (such as a mental hospital), the APP may associate this kind of sensitive information (may be suffering from a mental disorder) with a specific user, and consequently privacy disclosure indicating that "Zhang San may suffer from a mental disorder" occurs. On the contrary, if it is difficult for an APP to infer the user identity, even the APP reads that a current location of the user is a mental hospital, because the APP cannot infer the user identity, the APP can obtain only information indicating that "somebody may suffer from a mental disorder" at maximum, and the information does not disclose privacy of anybody because no identity information is included. If a current user appears in an insensitive area, such as a hustle and bustle street, because it is difficult to deduce effective implicit information from such a location, even an APP knows an identity of the user, it is also difficult to deduce useful information about the user; therefore, privacy disclosure does not occur. It can be learned that a necessary and sufficient condition of threatening user privacy when a current APP accesses a location of a user is that a current location of the user is sensitive and the APP can infer an identity of the user.

In reality, different APPs are extremely different in inferring a user identity. For example, APPs such as Alipay, Jingdong, and Taobao may accurately and clearly know an identity of each user because they are associated with a bank account of the user and record a name and an address of the user. However, it is difficult for an APP like an e-book reader (such as ezPdf) to infer the user identity due to lack of user information. Although some APPs read an address book of a user, it is difficult for these APPs to infer a user identity without having a large amount of background knowledge about the user. In addition, an APP provided by a famous developer in the industry or a well-known APP market may also relatively pay more attention to protecting user privacy, and a possibility of intentionally inferring an identity of a user and collecting privacy of the user is relatively low.

It is noted herein that it does not mean that a manner in which an APP collects a location of a user is reasonable and proper. In real life, many APPs (such as Alipay) may clearly know an identity of each user because they are associated with a bank account or detailed user information. In addition, these APPs all have services always running on the background of a mobile phone; therefore, the APPs may collect a location of the user anytime and anywhere. As long as the user installs and uses such an APP, it is generally difficult to avoid a situation in which the location is collected. What we can do herein is to ensure that these APPs do not collect some locations that may disclose user privacy, because the user still chooses to use these APPs after all.

Because of relative stability of a home and a working place, areas of daily activities of most users generally have a rough scope. In a scope of daily activities of a user, some areas are more sensitive compared with other areas, for example, when at home, the user does not want a home location to be disclosed because a personal location is collected. However, when the user appears on a commuting road, a location is not much sensitive to an extent. It can be learned that the user may hope to execute different location protection policies in different areas within a scope of activities of the user, so as to protect personal privacy. In addition, an activity area of the user features specific repeatability, for example, most users travel to and from work according to a fixed route. In the foregoing example, a CEO planning a company acquisition may need to repeatedly go to another company several times to discuss acquisition terms. After the scope of the daily activities of the user is divided into areas with different sensitivity levels for the first time, afterwards, when the user carrying an intelligent terminal enters the areas, a system may automatically determine privacy sensitivity of a current location, and control visibility of the current location to different APPs with different location trust levels according to a related location protection policy.

According to this embodiment of the present application, location trust classification is performed on an APP, a scope of activities of a user is divided into areas having different privacy sensitivity levels, it is automatically determined, according to a location trust level of the APP and a privacy sensitivity level of an area in which current location coordinates are located, whether privacy disclosure occurs when the APP accesses a current location, a specific response manner to a location query request from the APP is determined, and in a necessary case, accessing a real location of the user by the APP is limited. This can protect location information of a terminal more powerfully, and ensure a normal service function of the APP more effectively without a need of manually depriving and enabling a location right of the APP by the user.

This embodiment of the present application proposes a geographical location protection solution that is based on geographical area privacy sensitivity and an APP identity identifying capability, which considers a location privacy protection requirement of a user and location-based service function availability of an APP, so that the APP can read a location of the user only when user privacy is not threatened, and that a service function of the APP is protected from interference as far as possible. For a sensitive location area, this solution ensures that only APPs having high location credibility can access real location coordinates of the user; for an insensitive location area, this solution enables as many APPs as possible to access a real location of the user to ensure normal service functions of the APPs; and allows automatically determining privacy sensitivity of a location according to a different geographical area activity regularity of each user, and imposing a corresponding privacy protection policy.

Figure 4:
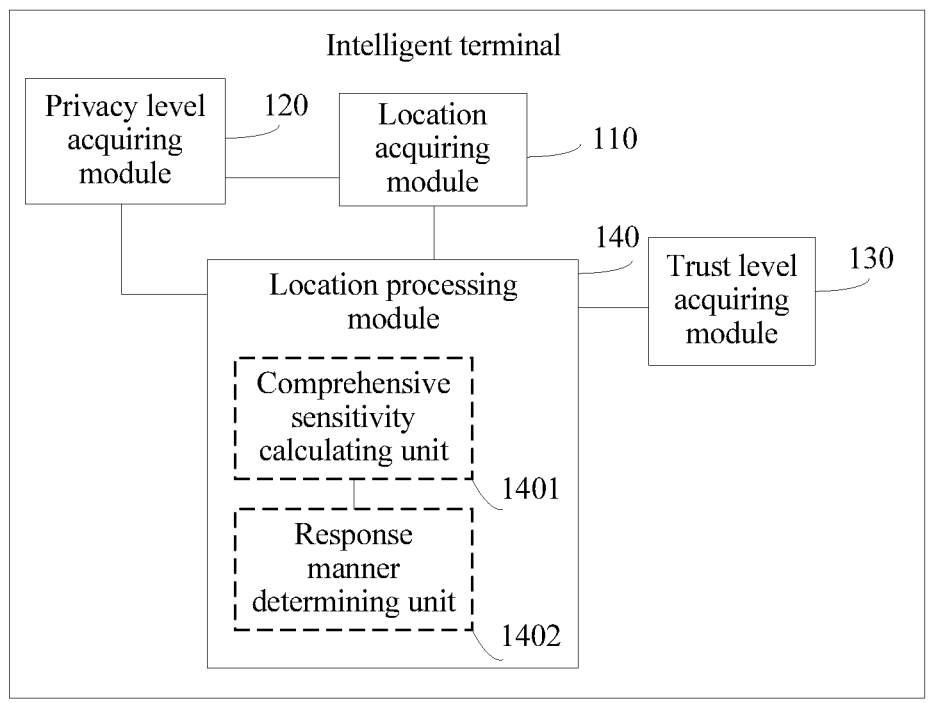
FIG. 4 is a structural diagram of an intelligent terminal according to an embodiment of the present application.

As shown in FIG. 4, an embodiment of the present application discloses an intelligent terminal, where the intelligent terminal includes a location acquiring module 110, a privacy level acquiring module 120, a trust level acquiring module 130, and a location processing module 140.

The location acquiring module 110 is configured to respond to a location query request from an APP, and acquire current location coordinates of the intelligent terminal.

When wanting to query the current location coordinates of the intelligent terminal, an APP sends a current location query request by means of invoking a location API. After receiving the location query request, the location API triggers an action of acquiring the current location coordinates of the intelligent terminal, and the location acquiring module 110 acquires the current location coordinates of the intelligent terminal.

The privacy level acquiring module 120 is configured to acquire a privacy sensitivity level of an area in which the current location coordinates acquired by the location acquiring module 110 are located, where the privacy sensitivity level of the area in which the current location coordinates are located corresponds to a difficulty level of obtaining the current location coordinates by the APP, and a higher privacy sensitivity level of the area in which the current location coordinates are located indicates a higher difficulty level of obtaining the current location coordinates by the APP.

A specific manner in which the privacy level acquiring module 120 acquires the privacy sensitivity level of the area in which the current location coordinates are located is described in detail in the description of step S102 in the foregoing method embodiment, and details are not described herein again.

The trust level acquiring module 130 is configured to acquire a location trust level of the APP, where the location trust level of the APP corresponds to the difficulty level of obtaining the current location coordinates by the APP, and a higher location trust level of the APP indicates a lower difficulty level of obtaining the current location coordinates by the APP.

A specific manner in which the trust level acquiring module 130 acquires the location trust level of the APP is described in detail in the description of step S103 in the foregoing method embodiment, and details are not described herein again.

The location processing module 140 is configured to determine, according to the location trust level, acquired by the trust level acquiring module 130, of the APP and the privacy sensitivity level, acquired by the privacy level acquiring module 120, of the area in which the current location coordinates are located, a response manner corresponding to the location query request of the APP.

Optionally, as shown in dashed line boxes in FIG. 4, the location processing module 140 includes a comprehensive sensitivity calculating unit 1401 configured to calculate, according to a formula $s=(1-T)*L$ (* indicates multiplication), a comprehensive sensitivity value s of the current location coordinates that are of the intelligent terminal and that are requested to query by the APP; and a response manner determining unit 1402 configured to, if $s<M$ (s is less than M, and M is a preset threshold), return real location coordinates without any change; and if $s>=M$ (s is greater than or equal to M, and M is a preset threshold), impose a special access limitation on current location access.

In an embodiment, the access limitation includes reminding a user that the APP is accessing a location of the user, performing logging for a current access behavior, returning a false location (such as a random value, a location near a real location, or a fuzzy value indicating a relatively large area), or the like.

According to this embodiment of the present application, location trust classification is performed on an APP, a scope of activities of a user is divided into areas having different privacy sensitivity levels, it is automatically determined whether privacy disclosure occurs when the APP accesses a current location, and in a necessary case, accessing a real location of the user by the APP is limited. This can protect location information of a terminal more powerfully, and ensure a normal service function of the APP as far as possible.

This embodiment of the present application proposes an intelligent terminal, where the intelligent terminal considers a location privacy protection requirement of a user and location-based service function availability of an APP, so that the APP can read a location of the user only when user privacy is not threatened, and that a service function of the APP is protected from interference as far as possible. For a sensitive location area, this solution ensures that only APPs having high location credibility can access real location coordinates of the user; for an insensitive location area, this solution enables as many APPs as possible to access a real location of the user to ensure normal service functions of the APPs; and allows automatically determining privacy sensitivity of a location according to a different geographical area activity regularity of each user, and imposing a corresponding privacy protection policy.

Figure 5:
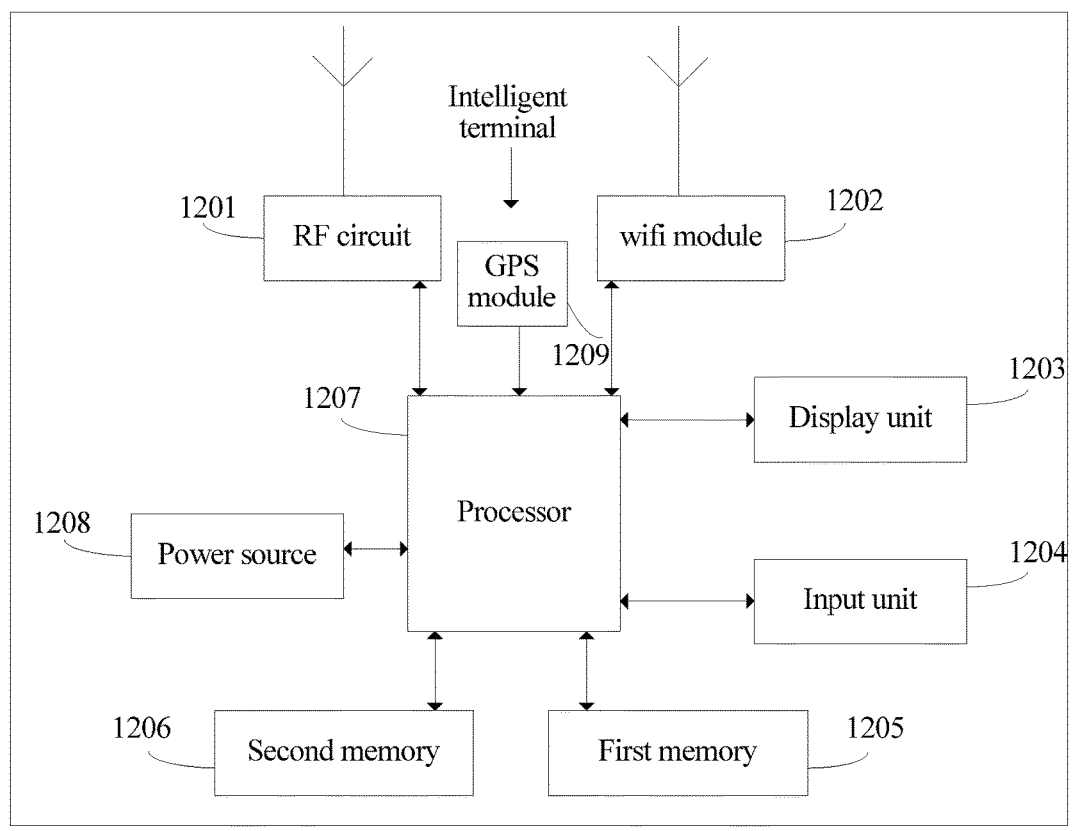
FIG. 5 is a structural diagram of an intelligent terminal according to an embodiment of the present application.

Referring to FIG. 5, FIG. 5 is a schematic structural diagram of an intelligent terminal 1200 according to an embodiment of the present application. The intelligent terminal includes hardware modules such as an radio frequency (RF) circuit 1201, a Wi-Fi module 1202, a display unit 1203, an input unit 1204, a first memory 1205, a second memory 1206, a processor 1207, a power source 1208, and a GPS module 1209. The intelligent terminal 1200 may be a mobile phone, a tablet computer, a personal digital assistant (PDA), a vehicle-mounted computer, or the like.

The RF circuit 1201 is configured to receive and transmit a communication signal. The Wi-Fi module 1202 is configured to connect to a network and scan a network signal. The RF circuit 1201 and/or the Wi-Fi module 1202 may contact a radio base station to acquire current location coordinates of the intelligent terminal.

The display unit 1203 is configured to display a user interaction interface, and the display unit 1203 may be configured to display information input by a user or information provided to the user, and various menu interfaces of the intelligent terminal. The display unit 1203 may include a display panel, and optionally, the display panel may be configured in a form of an liquid crystal display (LCD), an organic light-emitting diode (OLED), or the like. In specific implementation, an touch panel covers the display panel to form a touchscreen. The processor 1207 provides corresponding visual output on the touchscreen according to a type of a touch event.

The input unit 1204 may be configured to receive entered digital or character information, receive a user operation of switching an application interface, generate a switching signal, and generate signal input related to user setting and function control of the intelligent terminal. In this embodiment of the present application, the input unit 1204 may include the touch panel, which is also referred to as a touchscreen, and may collect a touch operation (for example, an operation performed by the user using any proper object or accessory such as a finger or a stylus on the touch panel) performed by the user on or near the touchscreen. In addition, the touch panel may be implemented in multiple types such as a resistive type, a capacitive type, an infrared type, and a surface acoustic wave type. In addition to the touch panel, the input unit 1204 may further include another input device, which includes but is not limited to one or more of a physical keyboard, a function button (such as a volume control button or a switch button), a trackball, a mouse, a joystick, and the like.

The first memory 1205 stores a preset quantity of APPs of the intelligent terminal 1200 and interface information. It may be understood that the second memory 1206 may be an external storage device of the intelligent terminal 1200, and the first memory 1205 may be an internal storage device of the intelligent terminal. The first memory 1205 may be one of the following: a non-volatile random-access memory (NVRAM), a dynamic random memory (DRAM), a static random-access memory (SRAM), a Flash memory, and the like. An operating system running on the intelligent terminal is generally installed on the first memory 1205. The second memory 1206 may be a hard disk, an optical disc, a universal serial bus (USB) flash drive, a floppy disk, a tape drive, a cloud server, or the like. Optionally, at present, some third-party APPs may also be installed on the second memory 1206.

The processor 1207 is a control center of the intelligent terminal, is connected to all parts of the entire terminal using various interfaces and lines, and performs, by running or executing a software program and/or a module that are stored in the first memory 1205 and invoking data stored in the second memory 1206, various functions of the intelligent terminal and data processing. Optionally, the processor 1207 may include one or more processing units.

The power source 1208 may supply power to the entire terminal, including lithium batteries of various models.

The GPS module 1209 is configured to acquire location coordinates of the intelligent terminal.

When an APP installed in the first memory 1205 wants to query the current location coordinates of the intelligent terminal, the following steps are performed.

1. The APP invokes an operating system location API installed in the first memory 1205 to acquire a location of the intelligent terminal.

2. After receiving an invoking instruction of the APP, the location API invokes, using the processor 1207, the GPS module 1209, the RF circuit 1201, or the Wi-Fi module 1202 to acquire the current location coordinates of the intelligent terminal.

3. The processor 1207 processes, according to a location trust level of a current APP, a privacy sensitivity level of an area in which a current location is located, current location coordinate data by invoking a processing program stored in the first memory 1205.

A specific processing manner is described in detail in the foregoing method and apparatus embodiments, and details are not described herein again.

4. The processor 1207 returns the processed coordinates to the API.

5. The API returns the processed location coordinates to the APP, and execution of the API ends.

According to this embodiment of the present application, location trust classification is performed on an APP, a scope of activities of a user is divided into areas having different privacy sensitivity levels, it is automatically determined, according to a location trust level of the APP and a privacy sensitivity level of an area in which current location coordinates are located, whether privacy disclosure occurs when the APP accesses a current location, a specific response manner corresponding to a location query request from the APP is determined, and in a necessary case, accessing a real location of the user by the APP is limited. This can protect location information of a terminal more powerfully, and ensure a normal service function of the APP more effectively without a need of manually depriving and enabling a location right of the APP by the user.

This embodiment of the present application proposes an intelligent terminal, where the intelligent terminal considers a location privacy protection requirement of a user and location-based service function availability of an APP, so that the APP can read a location of the user only when user privacy is not threatened, and that a service function of the APP is protected from interference as far as possible. For a sensitive location area, this solution ensures that only APPs having high location credibility can access real location coordinates of the user; for an insensitive location area, this solution enables as many APPs as possible to access a real location of the user to ensure normal service functions of the APPs; and allows automatically determining privacy sensitivity of a location according to a different geographical area activity regularity of each user, and imposing a corresponding privacy protection policy.

A person of ordinary skill in the art may understand that all or some of the processes of the methods in some embodiments may be implemented by a computer program instructing relevant hardware. The program may be stored in a computer readable storage medium. When the program runs, the processes of the methods in some embodiments are performed. The foregoing storage medium may include a magnetic disk, an optical disc, a read-only memory (ROM), or a random access memory (RAM).

The foregoing are merely exemplary embodiments of the present application. A person skilled in the art may make various modifications or variations to the present application according to the content disclosed in the application document without departing from the scope of the present application.

What is claimed is:

1. A method for protecting intelligent terminal location information, comprising:
 responding to a location query request from an application (APP), and acquiring current location coordinates of an intelligent terminal, the APP being installed in an operating system running on the intelligent terminal;
 acquiring a privacy sensitivity level of an area in which the current location coordinates are located, the privacy sensitivity level of the area in which the current location coordinates are located corresponding to a difficulty level of obtaining the current location coordinates by the APP, and a higher privacy sensitivity level of the area in which the current location coordinates are located indicating higher difficulty level of obtaining the current location coordinates by the APP;
 acquiring a location trust level of the APP, the location trust level of the APP corresponding to the difficulty level of obtaining the current location coordinates by the APP, and a higher location trust level of the APP indicating a lower difficulty level of obtaining the current location coordinates by the APP;
 calculating, according to a formula $s=(1-T)*L$, a comprehensive sensitivity value s of the current location coordinates that are of the intelligent terminal and that are requested to query by the APP, * indicating multiplication, T indicating the location trust level of the APP, and L indicating the privacy sensitivity level of the area in which the current location coordinates are located;
 comparing the comprehensive sensitivity value s of the current location coordinates with a preset threshold;
 returning real current location coordinates when s<M; and imposing a limitation on a response manner for the location query request from the APP when s>=M.

2. The method for protecting intelligent terminal location information according to claim 1, wherein imposing the limitation on the response manner for the location query request from the APP comprises rejecting the location query request from the APP.

3. The method for protecting intelligent terminal location information according to claim 1, wherein imposing the limitation on the response manner for the location query request from the APP comprises reminding a user of the intelligent terminal that the APP is attempting to access a current location.

4. The method for protecting intelligent terminal location information according to claim 1, wherein imposing the limitation on the response manner for the location query request from the APP comprises performing logging for a current access behavior of the APP.

5. The method for protecting intelligent terminal location information according to claim 1, wherein imposing the limitation on the response manner for the location query request from the APP comprises returning false location coordinates to the APP, the false location coordinates being any one of randomly generated location coordinates, coordinates of a location near a current location, and coordinates indicating a relatively large area in which the current location is located.

6. An intelligent terminal, comprising:
a memory storing executable instructions; and
a processor coupled to the memory and configured to:
respond to a location query request from an application (APP), and
acquire current location coordinates of the intelligent terminal, the APP being installed in an operating system running on the intelligent terminal;
acquire a privacy sensitivity level of an area in which the current location coordinates are located, the privacy sensitivity level of the area in which the current location coordinates are located corresponding to a difficulty level of obtaining the current location coordinates by the APP, and a higher privacy sensitivity level of the area in which the current location coordinates are located indicating higher difficulty level of obtaining the current location coordinates by the APP;
acquire a location trust level of the APP, the location trust level of the APP corresponding to the difficulty level of obtaining the current location coordinates by the APP, and a higher location trust level of the APP indicating lower difficulty level of obtaining the current location coordinates by the APP; and
calculate the location trust level of the APP according to a formula $T=p*m+q*(1-n)$, T indicating the location trust level of the APP, m being a real number, belonging to [0,1], and indicating a trust degree assigned to a source of the APP, n being a real number belonging to [0,1], and indicating a user identity inference capability of the APP, p being a real number and belonging to [0,1], q being a real number and belonging to [0,1], and p+q=1, and p and q respectively indicating a coefficient used for the trust degree assigned to the source of the APP in calculating the location trust level of the APP and a coefficient used for the user identity inference capability of the APP in calculating the location trust level of the APP.

7. The intelligent terminal according to claim 6, wherein the processor is further configured to return false location coordinates to the APP, false location coordinates being any one of randomly generated location coordinates, coordinates of a location near the current location, and coordinates indicating a relatively large area in which the current location is located.

8. The intelligent terminal according to claim 6, wherein the processor is further configured to perform logging for a current access behavior of the APP.

9. The intelligent terminal according to claim 6, wherein the processor is further configured to reject the location query request from the APP.

10. The intelligent terminal according to claim 6, wherein the processor is further configured to remind a user of the intelligent terminal that the APP is attempting to access a current location.

11. A method for protecting intelligent terminal location information, comprising:
responding to a location query request from an application (APP), and acquiring current location coordinates of an intelligent terminal, the APP being installed in an operating system running on the intelligent terminal;
acquiring a privacy sensitivity level of an area in which the current location coordinates are located, the privacy sensitivity level of the area in which the current location coordinates are located corresponding to a difficulty level of obtaining the current location coordinates by the APP, and a higher privacy sensitivity level of the area in which the current location coordinates are located indicating a higher difficulty level of obtaining the current location coordinates by the APP; and
calculating a location trust level of the APP according to a formula $T=p*m+q*(1-n)$, the location trust level of the APP corresponding to the difficulty level of obtaining the current location coordinates by the APP, and a higher location trust level of the APP indicating a lower difficulty level of obtaining the current location coordinates by the APP, T indicating the location trust level of the APP, m being a real number within a range [0,1] and indicating a trust degree assigned to a source of the APP, n being a real number belonging to [0,1], and indicating a user identity inference capability of the APP, the user identity inference capability of the APP indicating a capability of the APP for identifying a user identity of the intelligent terminal, p being a real number and belonging to [0,1], q being a real number and belonging to [0,1], and p+q=1, and p and q respectively indicating a coefficient used for the trust degree assigned to the source of the APP in calculating the location trust level of the APP and a coefficient used for the user identity inference capability of the APP in calculating the location trust level of the APP.

* * * * *

UNITED STATES PATENT AND TRADEMARK OFFICE
CERTIFICATE OF CORRECTION

PATENT NO. : 10,178,548 B2
APPLICATION NO. : 15/491072
DATED : January 8, 2019
INVENTOR(S) : Zhengde Zhai, Yu Shen and He Wei Page 1 of 1

It is certified that error appears in the above-identified patent and that said Letters Patent is hereby corrected as shown below:

On the Title Page

Item (30), Line 1: "201410811351" should read "201410811351.0"

In the Claims

Column 18, Line 49: insert --a-- after "indicating"

Column 19, Line 43: insert --a-- after "indicating"

Column 19, Line 50: insert --a-- after "indicating"

Column 20, Line 9: insert --the-- before "false"

Signed and Sealed this
Twelfth Day of March, 2019

Andrei Iancu
*Director of the United States Patent and Trademark Office*